United States Patent [19]

Lewis

[11] Patent Number: 4,661,819
[45] Date of Patent: Apr. 28, 1987

[54] DOPPLER TOLERANT BINARY PHASE CODED PULSE COMPRESSION SYSTEM

[75] Inventor: Bernard L. Lewis, Fort Washington, Md.

[73] Assignee: The United States of America as represented by the Secretary of the Navy, Washington, D.C.

[21] Appl. No.: 493,831

[22] Filed: May 12, 1983

[51] Int. Cl.[4] .............................................. G01S 13/28
[52] U.S. Cl. .................................................. 342/201
[58] Field of Search .......... 343/17.2 R, 17.5, 17.2 PC, 343/5 DP, 7.7, 17.1 R, 7.5; 367/904; 375/60, 66, 103; 342/128–133, 200–201

[56] References Cited

U.S. PATENT DOCUMENTS

| | | | |
|---|---|---|---|
| 3,202,989 | 8/1965 | Kagawa et al. | 343/17.2 PC |
| 3,714,653 | 1/1973 | Thor et al. | 343/17.2 PC |
| 3,905,033 | 9/1975 | Moore et al. | 343/7.7 |
| 3,945,010 | 3/1976 | Wardrop | 343/17.2 PC |
| 3,981,013 | 9/1976 | Christensen | 343/17.1 R |
| 4,096,478 | 6/1978 | Chavez | 343/7.7 |
| 4,110,755 | 8/1978 | Zottl | 343/17.2 PC |
| 4,136,341 | 1/1979 | Mulder et al. | 343/17.2 PC |
| 4,153,900 | 5/1979 | Novak et al. | 343/17.2 PC |
| 4,156,876 | 5/1979 | Debuisser | 343/17.2 PC |
| 4,167,737 | 9/1979 | Freedman | 343/17.2 PC |
| 4,200,872 | 4/1980 | Sifferlen et al. | 367/904 |
| 4,237,461 | 12/1980 | Cantrell et al. | 343/5 FT |
| 4,241,347 | 12/1980 | Albanase et al. | 343/9 R |
| 4,338,604 | 7/1982 | Petitjean | 343/17.2 R |
| 4,513,289 | 4/1985 | Kretschmer | 343/17.2 PC |

OTHER PUBLICATIONS

M. N. Cohen, E. S. Sjoberg, "Intrapulse Polarization Agile Radar", Radar—82, Conference, Oct. 18–20, 1982, pp. 7–11.
M. I. Skolnik, "Introduction to Radar Systems", Second Edition, McGraw Hill Book Co., 1980, pp. 428–430.

Primary Examiner—Thomas H. Tarcza
Assistant Examiner—Bernarr Earl Gregory
Attorney, Agent, or Firm—Sol Sheinbein; John L. Forrest

[57] ABSTRACT

A Doppler tolerant binary phase coded pulse compression system. An input pulse is converted to a binary coded sequence of pulses according to a phase code. The sequence of pulses is used to frequency code a transmitted carrier. Echo returns are demodulated and supplied to a matched filter for comparison to the binary phase code to detect targets in the echo returns. The detection of targets is independent of target speed. In an alternative embodiment, the binary coded sequence of pulses is used to amplitude code a transmitted carrier. Echo returns are then demodulated and processed in the matched filter to detect targets independently of target speed.

13 Claims, 2 Drawing Figures

DOPPLER TOLERANT BINARY PHASE CODED PULSE COMPRESSION SYSTEM

BACKGROUND OF THE INVENTION

The present invention relates, in general, to a binary phase coded pulse compression transmission and reception system and, more particularly, to a binary phase coded pulse compression system which is inherently Doppler tolerant.

Binary phase coded transmission and reception systems such as command links, communications systems, and binary phase coded pulses compression systems in radar and sonar are adversely affected by relative motion between the transmitter and receiver or between a target and a radar or sonar transmitter and receiver. This effect results when the phase code is transmitted as phase modulation of a radio frequency carrier that is Doppler shifted by time varying path length changes between the transmitter and receiver. The Doppler or time varying path length alters the phase variation with time which was transmitted and mismatches the transmitted and received signals. This is why pseudorandom or random binary phase codes produce thumbtack ambiguity diagrams, as is well-known in the art.

The present invention provides a solution to this problem by providing a binary phase coded pulse compression system which is inherently Doppler tolerant.

SUMMARY OF THE INVENTION

Accordingly, one object of the present invention is to provide a binary phase coded pulse compression system.

Another is to provide a binary phase coded pulse compression system not affected by target speed and thus Doppler tolerant.

These and other objects and advantages are provided by a Doppler tolerant binary phase coded system that includes an input signal expander coupled to receive an input pulse for expanding the input pulse into a binary coded sequence of pulses according to a binary code. A modulator receives the binary coded pulse sequence and frequency shift codes a carrier in response to the pulse sequence. The frequency coded carrier is transmitted and echo returns reflected from targets are received. The echo returns are demodulated in a frequency discriminator to produce an echo sequence of pulses. A pulse compression circuit receives the echo sequence of pulses and compares them to the binary code to detect a target sequence of pulses which matches the binary code, and compresses the detected target sequence to produce an output echo pulse signal representative of targets detected by the system. The output echo pulse signal is independent of the speed of the detected target. In an alternative embodiment, the binary coded sequence of pulses is used to amplitude code a carrier which is then transmitted. Received echo returns are amplitude demodulated to produce the echo sequence of pulses whichis then processed in the pulse compressor to produce an output echo pulse signal representative of detected targets which is independent of target speed.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
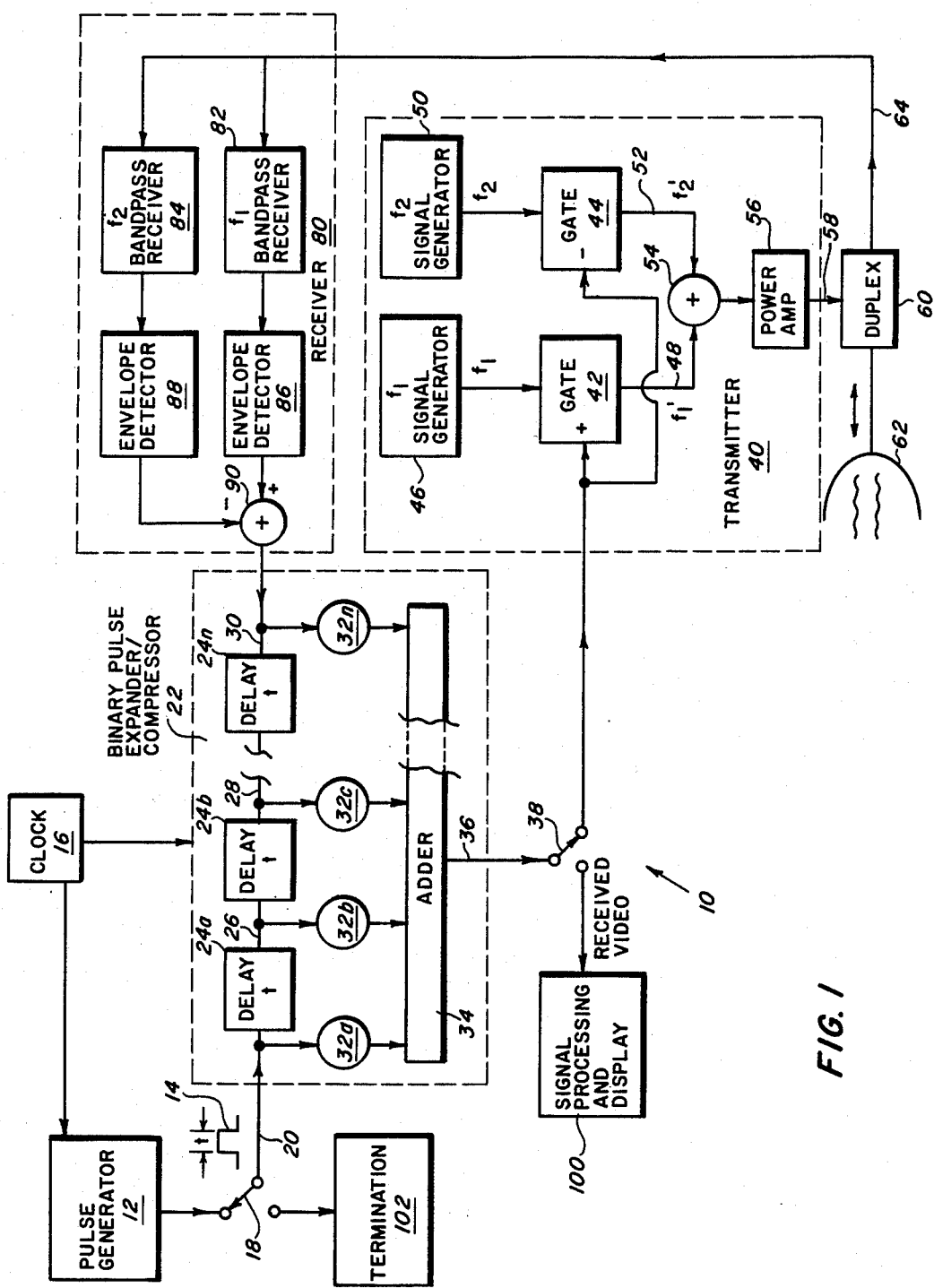
FIG. 1 is a schematic block diagram illustrating a binary phase coded pulse compression system according to a first preferred embodiment of the present invention.

Referring now to the drawings, wherein like reference numerals designate identical or corresponding parts throughout the several views, and more particularly to FIG. 1 thereof, a binary phase coded pulses compression system 10 includes a pulse generator 12 which produces a pulse 14 under control of a clock 16. The pulse 14 has a pulse length t which may be in the microsecond or nanosecond range for a radar system or which may be any other length appropriate for the system being implemented.

The pulse 14 is supplied through a switch 18 to a first input 20 of a binary pulse expander/compressor 22. Within the expander/compressor 22 the pulse 14 is supplied to a serially connected chain of delay circuits 24a, 24b, through 24n. Each delay circuit delays the pulse 14 by a time t equal to the length t of the pulse 14. Thus, the signal appearing at the output 26 of delay circuit 24a is a replica of the pulse 14 delayed by time t. Similarly, the output 28 of the delay circuit 24b is delayed by 2t and the output 30 of the delay circuit 24n is delayed by nt. Any appropriate number of delay circuits n may be included as necessitated by the binary code to be implemented. The delay circuits may be analog or digital under control of the clock 16, as is known in the art.

The input pulse 14 appearing at the first input 20 and the delayed pulses appearing at the respective delay circuit outputs 26, 28, and 30 are respectively coupled to a plurality of binary phase weighting circuits 32a, 32b, 32c and 32n. Each phase weighting circuit alters the phase of the respective input pulse by either 0° (+1) or 180° (−1) as required by the binary phase code being implemented. The outputs of the phase weighting circuits 32a through 32n are added together in an adder circuit 34 to produce an expanded output 36. The output 36 is a binary coded pulse sequence containing (n+1) pulses. Each pulse in the sequence may have a value of either +1 or −1 according to the particular phase code used. By appropriately selecting the number of delay circuits and the phase weightings to be used, any Barker code, maximum length code, or any other binary code may be implemented by the expander/compressor circuit 22, as should be apparent to the skilled practitioner.

The binary coded pulse sequence 36 is supplied via switch 38 to a transmitter 40 where it is used to modulate an RF carrier for transmissions, as will be described in detail below. Echo signals received as a result of the transmission of the modulated RF carrier are processed and demodulated in a receiver 80 to produce a sequence of pulses, as will be described in detail below. The output of the receiver 80 is supplied to the expander/compressor 22 at junction 30, which acts as a second input. The pulse sequence supplied to the junction 30 travels through the delay circuits 24n through 24a in the opposite direction to the direction traveled by the pulse 14. The delayed pulses are phase weighted by the phase weighting circuits 32n through 32a and the phased outputs of these circuits are added in the adder 34 to produce a video output appearing at line 36. The expander/compressor 22 operates to compress the received signal to form a video output and thus acts as a matched filter, as is well-known in the art. The video output includes time-inverted equivalents of the input pulse 14 for the echo signals received.

In the receive mode, the video output of the adder 34 is supplied to the switch 38 which is positioned to direct the video output to various well-known signal processing and display functions identified by reference numeral 100. Further during the receive mode, the first input 20 of the expander/compressor 22 is coupled through switch 18 to a termination 102 which provides a load for the delay circuit 24a to prevent undesired reflected signals from developing and propagating through the chain of delay circuits. If the delay circuits 24a through 24n are digitally implemented, no reflection problem will occur and the switch 18 and termination 102 may be eliminated.

The binary pulse expander/compressor 22 and the binary codes to be implemented therein are well-known in the art. For example, a description of pulse code compression methods appears in Chapter 11 of M. I. Skolnik, "Introduction to Radar Systems", Second Edition, McGraw-Hill Book Co., 1980, the contents of which are incorporated herein by reference.

As previously discussed, the binary coded sequence of pulses produced from the input pulse 14 by the expander/compressor 22 is supplied to the transmitter 40 via the switch 38. Within the transmitter 40, the pulse sequence is supplied to a pair of gates 42 and 44. The gate 42 is coupled to receive a signal $f_1$ from a signal generator 46. Th signal $f_1$ is gated through the gate 42 to produce a pulsed signal $f_1'$ appearing at an output line 48 by positive pulses in the pulse sequence. Similarly, the gate 44 is coupled to receive a signal $f_2$ from a signal generator 50. The signal $f_2$ is gated through the gate 44 to produce a pulsed signal $f_2'$ appearing at an output line 52 in response to negative pulses in the pulse sequence. The pulsed signals $f_1'$ and $f_2'$ are coupled to a summing junction 54 where they are combined to produce a sequence of pulses at frequences $f_1$ and $f_2$ which correspond to the binary phase code being implemented. The combined sequence of pulses is supplied to a power amplifier 56 which converts the sequence of pulses to a high powered RF signal 58 by modulating an RF carrier $f_o$ in a well-known manner. The frequencies of the signals $f_1$ and $f_2$ should be selected such that the frequency $f_1$ is greater than the carrier frequency $f_o$ while the frequency $f_2$ is selected to be lower then the carrier frequency $f_o$. The transmitter 40 thus converts the binary phase coded sequence of pulses into a frequency coded RF signal 58 according to a method called frequency shift keying (FSK).

In the embodiment described above, the signals $f_1$ and $f_2$ are low level IF signals. Alternatively, $f_1$ and $f_2$ could each be high power RF signals which are combined in response to the binary phase coded pulse sequence, as should now be apparent to the skilled practitioner.

The frequency coded RF signal 58 is coupled through a duplex network 60 to an antenna 62. Echo signals received by the antenna 62 are coupled through the duplex network 60 to the receiver 80 via a line 64.

The duplex network 60 and the antenna 62 are well known in the art.

The receiver 80 demodulates the echo signal by means of frequency discrimination. In the receiver 80, the echo signal is coupled to a pair of bandpass receivers 82 and 84. The bandpass of receiver 82 is centered at the frequency $f_1$ while the bandpass of the receiver 84 is centered at the frequency $f_2$. The bandwidth of each receiver, 82 and 84, must be sufficiently wide so as to pass the pulses in the received echo signal. Thus, each bandwidth should be at least $1/t$, where t is the width of the input pulse 14. Additionally, the bandwidth should be sufficiently wide so as to accommodate frequency shifts in the received signal due to target Doppler. Generally, this will not be a problem for radar signals. For example, for a pulse width t of 1 microsecond the receiver bandwidth should be 1 MHz. At a carrier frequency $f_o$ of 10 GHz (X-band) the maximum Doppler shift due to a Mach 5 target would be approximately 100 KHz which is well within the 1 MHz bandwidth. At higher carrier frequencies the expected Doppler shift is a design limitation which should be accomodated.

The output of the receiver 82 contains the pulse components of the echo signal at the frequency $f_1$ plus or minus the Doppler shift. Similarly, the output of the receiver 84 contains the pulse components at the frequency $f_2$ pulse or minus the Doppler shift. The outputs of the receivers 82 and 84 are respectively coupled to a pair of envelope detectors 86 and 88 which demodulate the echo signal to baseband. The envelope detector 86 produces a positive output in response to the $f_1 \pm$ Doppler frequency components in the received echo signal while the detector 88 produces a negative output in response to the $f_2 \pm$ Doppler frequency components in the received echo signal. The bandpass receivers 82 and 84 and the envelope detectors 86 and 88 are all devices well-known in the art.

The positive pulse outputs of the detector 86 and the negative pulse outputs of the detector 88 are combined in a summing junction 90 to produce a sequence of positive and negative pulses. This sequence of pulses represents a replica of the binary phase coded sequence of pulses supplied to the transmitter 40 by the expander/compressor 22. The pulse sequence output of the summing junction 90 is supplied to the second input 30 of the expander/compressor 22 (the time delay reversed end) where it is compressed and "matched" to the transmitted binary phase code, as described above.

The binary phase coded pulse compression system 10 is inherently Doppler tolerant because no intelligence is carried by the phase of the transmitted and received signals. The binary phase code is frequency coded (FSK) onto the transmitted carrier. The frequencies of the coded information are shifted by target Doppler; however no distortion occurs in the received binary phase code supplied to the match filter (22) due to the broad band frequency selective detection system utilized in the receiver 80. Due to the inherent AC coupled nature of envelope detectors, any Doppler induced carrier frequency shifts are eliminated by the detectors 86 and 88.

In the embodiment shown in FIG. 1 and described above a frequency shift keyed (FSK) transmitted waveform is employed. The present invention is not limited to the use of FSK and thus any emission mode other than phase modulation may be used. For example, FIG. 2 illustrates a binary phase coded pulse compression system 200 according to a second preferred embodiment wherein amplitude modulation (AM) is employed.

In the system 200, the binary phase coded sequence of pulses from the expander/compressor 22 is supplied to a gate 242 within a transmitter 240. The gate 242 is coupled to receive the RF signal output of an RF signal generator 244. The RF signal is gated through gate 242 to a power amplifier 246 in response to positive going pulses within the phase coded pulse sequence. Alternatively, the RF signal could be gated in response to negative going pulses. The output 248 of the power amplifier 246 is a sequence of RF pulses which correspond to the binary phase code being used. The output 248 of the power amplifier 246 is supplied to the antenna 62 through the duplex network 60. The transmitter 240 has been described using low level RF keying provided by the gate 242. As an alternative, high level keying in the power amplifier 246 could be used, as should be apparent to the skilled practitioner.

The echo signals received by the antenna 62 in response to the transmitted RF signal are coupled through the duplex network 60 to a receiver 280 via the line 64. In the receiver 280, the received echo signal is coupled to a bandpass receiver, mixer, and amplifier circuit 282 which filters the echo signal and reduces it to an IF frequency. As with the embodiment of the present invention shown in FIG. 1 and described above, the bandwith of the receiver must be sufficiently wide so as to pass the received RF pulse signal and accomodate frequency shifts due to target Doppler. The output of the receiver, mixer, and amplifier circuit 282 is coupled to an envelope detector 284 which demodulates the IF signal to produce a baseband sequence of pulses similar to the phase coded sequence which was transmitted. The output of the envelope detector 284 is supplied to the second input 30 (time inverted input) of the expander/compressor 22 where it is matched to the binary phase code being used to produde an output video signal.

Figure 2:
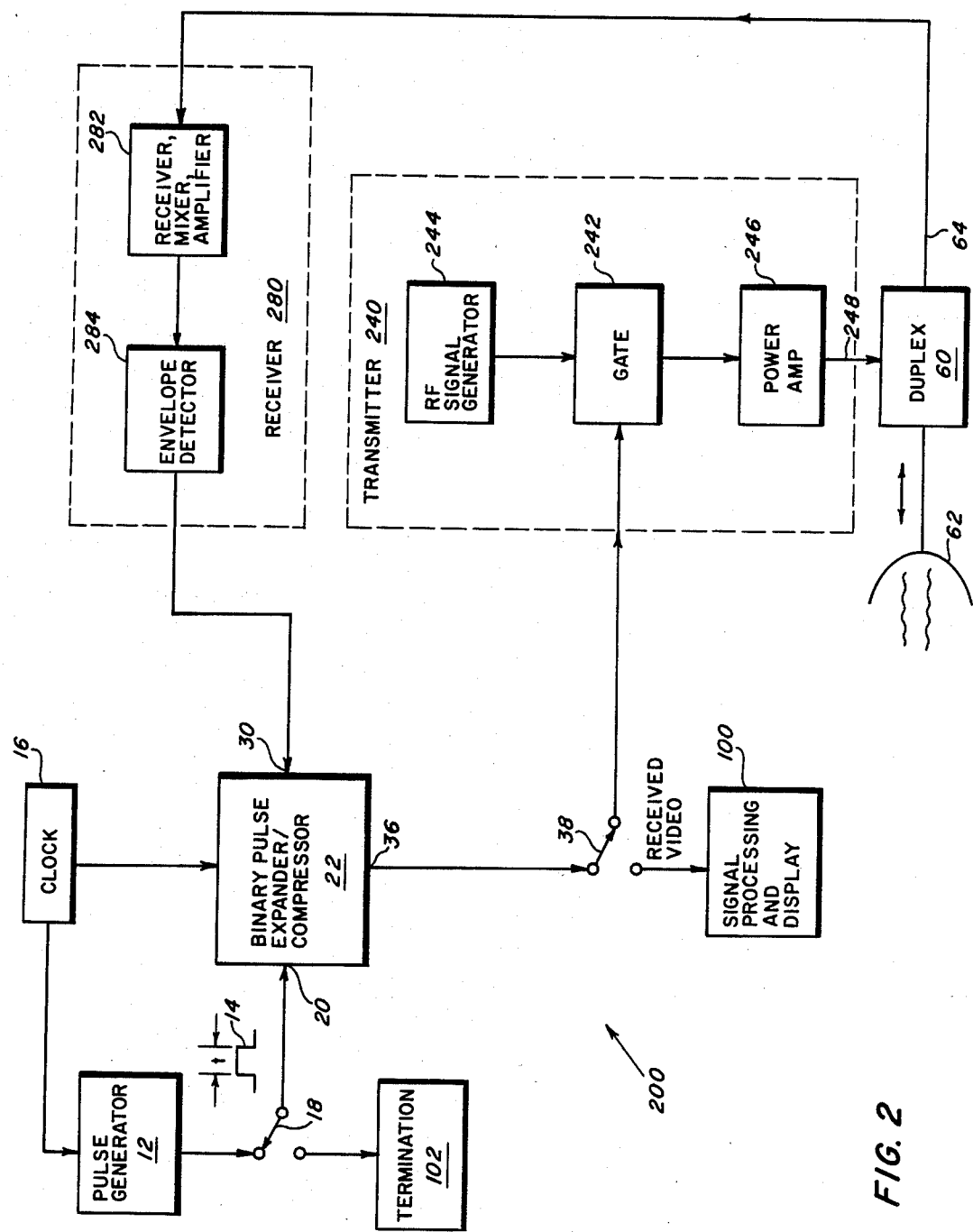
FIG. 2 is a schematic block diagram illustrating a binary phase coded pulse compression system according to a second preferred embodiment of the present invention.

The binary phase coded system of FIG. 2 is inherently Doppler tolerant. The phase coded information is transmitted and received in the form of an amplitude coded waveform which is not affected by Doppler shifts. Since no information is carried by the frequency or phase of the transmitted signal, the system is not sensitive to the effects of target Doppler.

Obviously, numerous modifications and variations of the present Invention are possible in light of the above teachings. It is therefore to be understood that within the scope of the appended claims, the invention may be practiced otherwise than as specifically described.

What is claimed as new and desired to be secured by Letters Patent of the United States is:

1. A Doppler tolerant binary phase coded system comprising:
   input signal expansion means coupled to receive an input pulse for expanding said input pulse into a binary coded sequence of pulses according to a binary code;
   modulation means coupled to receive said binary coded sequence of pulses for frequency shift coding a carrier in response thereto;
   means coupled to receive the output of said modulation means for transmitting said frequency shift coded carrier and for receiving frequency shift coded echo returns reflected by targets in response thereto;
   frequency discriminator means coupled to receive said echo returns for demodulating said returns to produce an echo sequence of pulses; and
   pulse compressor means coupled to receive said echo sequence of pulses for comparing said echo sequence of pulses to said binary code to detect a target sequence of pulses in said echo sequence of pulses which matches said binary code and for compressing said detected target sequence of pulses to produce an output echo pulse signal representative of targets detected by said system, said output echo signal being independent of target speed.

2. A Doppler tolerant binary phase coded system comprising:
   input signal expansion means coupled to receive an input pulse for expanding said input pulse into a binary coded sequence of pulses according to a binary code;
   modulation means coupled to receive said binary coded sequence of pulses for frequency shift coding a carrier in response thereto;
   means coupled to receive the output of said modulution means for transmitting said frequency shift coded carrier and for receiving frequency shift coded echo returns reflected by targets in response thereto;
   frequency discriminator means coupled to receive said echo returns for demodulating said returns to produce an echo sequence of pulses; and
   pulse compressor means coupled to receive said echo sequence of pulses for comparing said echo sequence of pulses to said binary code to detect a target sequence of pulses in said echo sequence of pulses which matches said binary code and for compressing said detected target sequence of pulses to produce an output echo pulse signal representative of targets detected by said system, said output echo pulse signal being independent of target speed, wherein said modulator means comprises frequency shift code generator means coupled to receive said binary coded sequence of pulses for converting said binary coded sequency to a frequency coded sequence of pulses containing pulses at a first frequency $f_1$ and pulses at a second frequency $f_2$.

3. The Doppler tolerant binary phase coded system as recited in claim 2, wherein said frequency shift code generator means comprises:
   first signal generator means for generating a first signal at said first frequency $f_1$;
   second signal generator means for generating a second signal at said second frequency $f_2$;
   first gate means coupled to receive said binary coded sequence of pulses and said first signal for coupling said first signal to an output terminal of said first gate means in response to positive polarity pulses in said binary coded sequence of pulses;
   second gate means coupled to receive said binary coded sequence of pulses and said second signal for coupling said second signal to an output terminal of said second gate means in response to negative polarity pulses in said binary coded sequence of pulses; and
   adder means coupled to said outputs of said first and second gate means for combining said first and second signals coupled through said respective first and second gate means and for producing said frequency coded sequence of pulses.

4. The Doppler tolerant binary phase coded system as recited in claim 2, wherein said binary code is a Barker code.

5. The Doppler tolerant binary phase coded system as recited in claim 2, wherein said binary code is a maximum length code.

6. The Doppler tolerant binary phase coded system as recited in claim 2, wherein said input signal expansion means and said pulse compressor means comprise:

delay line means including first and second inputs and a plurality of outputs for propagating input signals supplied to said first input in a first direction and input signals supplied to said second input in a second direction through said delay line means and for producing time delayed replicas of said input signals at said plurality of outputs, signals appearing at each of said plurality of outputs being delayed relative to the signals appearing at the remainder of said plurality of outputs, the number of said plurality of outputs being equal to the number of elements in said binary code, said first input being coupled to receive said input pulse, said second input being coupled to receive said echo sequence of pulses from said frequency discriminator means;

a plurality of phase weighting means individually coupled to respective outputs of said delay line means for phase weighting said outputs according to said binary code; and adder means coupled to receive the phase weighted outputs of said plurality of phase weighting means for combining said phase weighted outputs;

wherein said adder means produces as an output said binary coded sequence of pulses in response to the application of said input pulse to said first input of said delay line means; and wherein said adder means produces as an output said output echo pulse signal in response to the application of said echo sequence of pulses to said second input of said delay line means.

7. A Doppler tolerant binary pulse coded system comprising:

input signal expansion means coupled to receive an input pulse for expanding said input pulse into a binary coded sequence of pulses according to a binary code;

modulator means coupled to receive said binary coded sequence of pulses for amplitude coding a carrier in response thereto;

means coupled to said modulator means for transmitting said amplitude coded carrier and for receiving amplitude coded echo returns reflected by targets in response thereto;

amplitude demodulator means coupled to receive said echo returns for demodulating said returns to produce an echo sequence of pulses; and pulse compressor means coupled to receive said echo sequence of pulses for comparing said echo sequence of pulses to said binary code to detect a target sequence of pulses in said echo sequence of pulses which matches said binary code and for compressing said detected target sequence of pulses to produce an output echo pulse signal representative of targets detected by said system, said output echo pulse signal being independent of target speed.

8. A Doppler tolerant binary phase coded system comprising:

input signal expansion means coupled to receive an input pulse for expanding said input pulse into a binary coded sequence of pulses according to a binary code;

modulator means coupled to receive said binary coded sequence of pulses for amplitude coding a carrier in response thereto;

means coupled to said modulator means for transmitting said amplitude coded carrier and for receiving amplitude coded echo returns reflected by targets in response thereto;

amplitude demodulator means coupled to receive said echo returns for demodulating said returns to produce an echo sequence of pulses; and pulse compressor means coupled to receive said echo sequence of pulses for comparing said echo sequence of pulses to said binary code to detect a target sequence of pulses in said echo sequence of pulses which matches said binary code and for compressing said detected target sequence of pulses to produce an output echo pulse signal representative of targets detected by said system, said output echo pulse signal being independent of target speed, wherein said modulator means comprises:

RF signal generator means for generating an RF carrier at a frequency $f_o$;

gate means couple to receive said RF carrier and said binary coded sequence of pulses for coupling said RF carrier to an output of said gate means in response to positive polarity pulses in said binary coded sequence of pulses to amplitude code said RF carrier; and power amplifier means coupled to the output of said gate means for amplifying said amplitude coded RF carrier.

9. The Doppler tolerant binary phase coded system as recited in claim 8, wherein said binary code is a Barker code.

10. The Doppler tolerant binary phase coded system as recited in claim 8, wherein said binary code is a maximum length code.

11. The Doppler tolerant binary phase coded system as recited in claim 8, wherein said input signal expansion means and said pulse compressor means comprise:

delay line means including first and second inputs and a plurality of outputs for propagating input signals supplied to said first input in a first direction and input signals supplied to said second input in a second direction through said delay line means and for producing time delayed replicas of said input signals at said plurality of outputs, signals appearing at each of said plurality of outputs being delayed relative to the signals appearing at the remainder of said plurality of outputs, the number of said plurality of outputs being equal to the number of elements in said binary code, said first input being coupled to receive said input pulse, said second input being coupled to receive said echo sequence of pulses from said amplitude demodulator means;

a plurality of phase weighting means individually coupled to respective outputs of said delay line means for phase weighting said outputs according to said binary code; and adder means coupled to receive the phase weighted outputs of said plurality of phase weighting means for combining said phase weighted outputs;

wherein said adder means produces as an output said binary coded sequence of pulses in response to the application of said input pulse to said first input of said delay line means; and wherein said adder means produces as an output said output echo pulse signal in response to the application of said echo sequence of pulses to said second input of said delay line means.

12. A Doppler tolerant binary phase coded method comprising the steps of:

providing an input pulse;

expanding said input pulse into a binary coded sequence of pulses according to a binary code;

frequency shift coding an RF carrier with said binary coded sequence of pulses;

transmitting said frequency shift coded carrier;

receiving a frequency shift coded echo return signal reflected by targets in response to said transmitted carrier;

frequency demodulating said echo return signal to produce an echo sequence of pulses;

comparing said echo sequence of pulses with said binary code to detect a target sequence of pulses in said echo sequence of pulses which matches said binary code; and producing an output signal upon the detection of said target sequence of pulses, said output signal being independent of the target speed.

13. A Doppler tolerant binary phase coded method comprising the steps of:

providing an input pulse;

expanding said input pulse into a binary coded sequence of pulses according to a binary code;

amplitude coding an RF carrier with said binary coded sequence of pulses;

transmitting said amplitude coded carrier;

receiving an amplitude coded echo return signal reflected by targets in response to said transmitted carrier;

demodulating said echo return signal to produce an echo sequence of pulses;

comparing said echo sequence of pulses with said binary code to detect a target sequence of pulses in said echo sequence of pulses which matches said binary code; and producing an output signal upon the detection of said target sequence of pulses, said output signal being independent of target speed.

* * * * *